United States Patent [19]

Hirata et al.

[11] 3,983,215

[45] Sept. 28, 1976

[54] PROCESS FOR PREPARING NAOH.3.5 $H_2O$ CRYSTALS

[75] Inventors: Chuji Hirata, Yokohama; Yasunori Yokogawa; Tsutomu Tabira, both of Kawasaki, all of Japan

[73] Assignee: Ajinomoto Co., Inc., Tokyo, Japan

[22] Filed: July 19, 1974

[21] Appl. No.: 489,927

[30] Foreign Application Priority Data

July 19, 1973 Japan.................................. 48-81172

[52] U.S. Cl.................................. 423/198; 423/641
[51] Int. Cl.²........................................... C01D 1/32
[58] Field of Search .......... 423/641, 184, 192, 198; 23/302 R, 301 R

[56] References Cited
UNITED STATES PATENTS 1,733,879   10/1929   Hooker et al...................... 423/641
2,325,339   7/1943    Muskat............................... 423/641

FOREIGN PATENTS OR APPLICATIONS 472,754   9/1937   United Kingdom................. 423/641

OTHER PUBLICATIONS

Caustic Soda Handbook, Copyright 1953 Diamond Alkali Company, p. 48.

Primary Examiner—Oscar R. Vertiz
Assistant Examiner—Wayne A. Langel
Attorney, Agent, or Firm—Oblon, Fisher, Spivak, McClelland & Maier

[57] ABSTRACT

NaOH.3.5 $H_2O$ crystals are prepared by cooling a slurry of 32 to 34% aqueous NaOH solution containing NaOH.3.5 $H_2O$ seed crystals to below the temperature for saturating the aqueous NaOH solution with respect to NaOH.3.5 $H_2O$ and separating the precipitated crystals.

9 Claims, No Drawings

PROCESS FOR PREPARING NAOH.3.5 H₂O CRYSTALS

BACKGROUND OF THE INVENTION

1. Field of the Invention

This invention relates to the preparation of crystalline caustic soda 3.5 hydrate (abbreviated as $NaOH.3.5\ H_2O$ crystals) and more particularly, to the crystallization of $NaOH.3.5\ H_2O$ by cooling in a manner such that the $NaOH.3.5\ H_2O$ crystals do not adhere to the face (wall) of the cooling solution reaction vessel. The present invention is useful for the purification of recovery of caustic soda from crude solutions, such as so-called "cell liquors" produced by the customary electrolytic diaphragm process.

2. Description of the Prior Art

In the past, the industrial manufacture of caustic soda (NaOH) was accomplished by the mercury process, which comprises electrolyzing a sodium chloride (NaCl) aqueous solution, using mercury for the cathode and decomposing the sodium amalgam obtained. An alternate process is the diaphragm process, which eliminates the use of the mercury cathode. The mercury process is better than the diaphragm process, for producing high purity NaOH, but it has the weakpoint that treatment of the electrolysis residue such as mercury mud is required. This causes pollution difficulties.

In the manufacture of caustic soda by electrolysis of NaCl solutions or brine, using diaphragm cells, efficient operation will not permit the conversion of more than about 50 percent of the sodium chloride (NaCl) content of the solution into sodium hydroxide (NaOH). As a consequence, the direct product of the electrolytic operation, i.e., the cathode or so-called cell liquor, is a solution containing about three parts by weight of NaCl to two parts by weight of NaOH; a typical cell liquor made from saturated brine will have approximately the following composition:

1000 parts by weight of NaOH
1500 parts by weight of NaCl
7700 parts by weight of water The solution may, and usually does, contain impurities other than NaCl, such as iron compounds, sodium sulfate and potassium chloride.

A process for the purification of NaOH, which comprises preparing, at a temperature of about 10°C, a solution containing NaOH in a quantity exceeding that of a saturated solution, but not substantially exceeding 46%, and saturated with NaCl at a temperature in the neighborhood of 30°C, diluting the solution with water to a 38.8% aqueous NaOH solution, which corresponds to a $NaOH.3.5\ H_2O$ solution, and crystallizing the caustic soda from the solution by cooling, is employed for recovering NaOH from such crude solutions thereof.

Crystalline $NaOH.3.5\ H_2O$ is stable in the temperature range of 5°C to 15.5°C in 32% to 45% NaOH solutions. When the crystals are cooled to less than 5°C in such NaOH solutions, hydrate crystals other than the 3.5 hydrate of NaOH co-exist with the $NaOH.3.5\ H_2O$ crystals and the crystals melt when warmed above 15.5°C.

A caustic soda solution may be strongly supercooled, that is, cooled to a strongly supersaturated condition in the absence of seed crystals without producing crystallization, and in this supersaturated condition the solution is remarkably stable. Caustic soda solutions such as those involved in the process of the invention may be supercooled as much as 20°C, and in this supercooled condition are stable against such known methods of inducing crystallization as agitation, scratching the wall of the receptacle, introducing dust, or the like. However, crystallization can be induced quite readily by the use of seed crystals or by the application of sufficient supercooling.

Moreover, when aqueous NaOH solutions containing $NaOH.3.5\ H_2O$ crystals are cooled, $NaOH.3.5\ H_2O$ crystals will significantly adhere to the face or wall of the receptacle which is being cooled, and thus produce "scaling" of $NaOH.3.5\ H_2O$ crystals.

One examples of the extent of such adherence of the crystals to walls is as follows:

A 1 kg portion of an aqueous 37% NaOH solution was cooled to 11°C in a 2l-glass beaker set in a 10°C cold water bath. To the solution at 10°C was added 1 g of $NaOH.3.5\ H_2O$ crystals (seed crystals) and $NaOH.3.5\ H_2O$ crystallized at once. The temperature of the slurry rose to 14.7°C, because of the heat of crystallization. The slurry was then stirred to increase the yield of produced crystals until the temperature of the slurry was 13.5°C, and the beaker was removed from the cold water bath. The crystalline $NaOH.3.5\ H_2O$ slurry was removed from the beaker, and $NaOH.3.5\ H_2O$ crystals were separated from the slurry and weighed to obtain 272 g (105 g as NaOH). The mother liquor weighed 529 g (190 g as NaOH).

When the slurry was removed $NaOH.3.5\ H_2O$ crystals adhered to the cooling face of the beaker. The thickness of the adhered crystals was 7 to 8 mm. The adhered crystals were melted and weighed 200 g (75 g as NaOH). The amount of NaOH solution obtained by melting the adhered $NaOH.3.5\ H_2O$ crystals was considerable and shows the extent of the adherence of the crystals to the wall.

In the above example, even if the slurry was cooled to adjust for the small difference in temperature between the part in direct contact with the cooling wall and the central part of the slurry, for example, about 1°C of temperature difference between the two parts, many $NaOH.3.5\ H_2O$ crystals still adhered to the cooling wall. Therefore, when $NaOH.3.5\ H_2O$ crystals are produced by merely cooling a slurry containing $NaOH.3.5\ H_2O$ crystals, complicated operations, such as scraping the crystals adhering to the wall of the vessel, have been required in the past for the isolation of the crystals.

Such adherence of the crystals to the wall causes a lowering of the cooling efficiency, difficulty in recovery of crystals and lowering of the purity of the crystals. Therefore such known methods using walls for cooling are inadequate for producing industrially useful high purity NaOH. In order to solve the problem caused by adherence, a process for cooling which comprises the inflow of a gas, such as pressured freon and pressured butane into the slurry and adiabatically expanding the gas, or a process for cooling by vacuum evaporation, which are known special cooling processes, can be employed. However, such processes are not good in view of the high cost of the required closed system apparatus. Moreover, the process using gas is impractical in view of the high cost for recovery of gas, high price of the gas itself, and the loss of the gas. Furthermore, the process for cooling by vacuum evaporation is not advantageous industrially in view of the very large equipment needed for producing vacuums and cooling and because of the high vacuums required for a crystallization temperature of less than 15°C.

A need exists therefore for an efficient, inexpensive method of obtaining high purity NaOH.3.5 H$_2$O crystals without adherence to the cooling walls.

SUMMARY OF THE INVENTION

Accordingly, one object of the invention is to provide a process for producing high purity NaOH.3.5 H$_2$O crystals by easily and cheaply precipitating the crystals without adherence of the crystals to the wall of the crystallizing vessel (receptacle) and without any of the above special equipment.

Briefly, this object and other objects of the invention as hereinafter will become more readily apparent can be obtained by cooling a homogeneous aqueous NaOH solution of 32 to 34%

$$( \frac{NaOH}{NaOH + H_2O} \times 100)$$

by weight NaOH containing NaOH.3.5 H$_2$O seed crystals in a reaction vessel to below the temperature for saturating said solution with respect to NaOH.3.5 H$_2$O, and separating NaOH.3.5 H$_2$O crystals from said solution. Large cubic NaOH.3.5 H$_2$O crystals greater than 1 mm$^3$ containing less than 0.15% NaCl are obtained.

DETAILED DESCRIPTION OF THE PREFERRED EMBODIMENTS

In this specification, the concentration (%) of NaOH solutions is expressed as $$( \frac{NaOH}{NaOH + H_2O} \times 100)$$

by weight. Therefore, the concentration of NaOH in solutions containing inpurities such as NaCl, is slightly lower than the actual concentration of NaOH.

Aqueous NaOH solutions of various concentrations containing NaOH.3.5 H$_2$O crystals were cooled from the temperature for saturating the NaOH solutions to a given NaOH concentration, and the amount of NaOH.3.5 H$_2$O crystals which adhered to the wall of the stainless steel reaction vessel was measured. The results are listed in Table 1.

temperature for saturating an NaOH solution to the given NaOH concentration is more than 11°C) was cooled, NaOH.3.5 H$_2$O crystals markedly adhered to the cooling face (wall) of the reaction vessel.

The above slurry is an aqueous NaOH solution containing NaOH.3.5 H$_2$O crystals, for example, as obtained immediately by contacting a supersaturated aqueous NaOH solution with NaOH.3.5 H$_2$O crystals or as obtained by preparing an aqueous NaOH solution containing NaOH.3.5 H$_2$O crystals by other conventional means. The cooling was conducted to increase the volume of the obtained crystals, as mentioned above.

On the contrary, when a slurry with a liquid phase containing 32 to 34% NaOH (the temperature for saturating an NaOH solution to the given NaOH concentration is less than 10°C) was cooled to a supersaturated condition with respect to NaOH.3.5 H$_2$O, adherence of the crystals was almost absent.

Since it has been widely believed that whenever a slurry containing NaOH.3.5 H$_2$O crystals is cooled with removal of the heat of crystallization of NaOH.3.5 H$_2$O, many crystals of NaOH.3.5 H$_2$O, many crystals of NaOH.3.5 H$_2$O would adhere to the wall of a reaction vessel, it is significant that adherence of the crystals to the wall of the reaction vessel does not arise by the process of the invention wherein NaOH.3.5 H$_2$O are crystallized by cooling a saturated or supersaturated aqueous NaOH solution with the above specified concentration of NaOH, namely 32 to 34% containing NaOH.3.5 H$_2$O crystals with removal of the heat of crystallization of NaOH.3.5 H$_2$O.

The process of the present invention is exemplified as follows:

1. A 32 to 34% (concentration of liquid phase) aqueous NaOH solution containing NaOH.3.5 H$_2$O crystals (see crystals) is prepared.
2. The prepared mixture is cooled to remove the heat of crystallization of NaOH.3.5 H$_2$O. The temperature for the cooling of the NaOH solution is from 10° to 0°C.
3. The liquid phase in the slurry is adjusted and maintained usually to 32 to 34% NaOH content, for example, by adding NaOH, H$_2$O or NaOH solution, particularly 38 to 40% NaOH solution approximately corresponding to NaOH.3.5 H$_2$O, to the

TABLE 1

| Example | Concentration of NaOH before cooling (%) | Starting and Ending Temperature for cooling Start*[1] | End | Concentration of NaOH after crystallization (%) | Adhering Crystals/Total crystals (%) |
|---|---|---|---|---|---|
| 1 | 43 | 11.6 | 8.5 | 44.4 | 65 |
| 2 | 38.5 | 15.2 | 15.2*[2] | 38.5 | 75 |
| 3 | 36 | 13.5 | 10.0 | 34.0 | 73 |
| 4 | 35 | 12.0 | 7.0 | 33.3 | 60 |
| 5 | 35 | 12.0 | 5.5 | 32.5 | 65 |
| 6 | 34 | 10.0 | 7.0 | 33.0 | 5 |
| 7 | 33 | 10.0 | 5.0 | 32.5 | 0 |
| 8 | 33 | 7.0 | 5.0 | 32.5 | 0 |
| 9*[3] | 33 | 7.0 | 7.0*[2] | 33.0 | 0 |

*[1]Starting temperature is the temperature for saturating NaOH solution to a given NaOH concentration.
*[2]Since the heat of crystallization of NaOH.3.5 H$_2$O crystals is 5.38 Kcal/mol, even if a slurry is maintained at a fixed temperature by removing heat from the system, NaOH.3.5 H$_2$O crystals, whose volume corresponds to calories of the removed heat will be precipitated.
*[3]Data in Example 2 which comprises continuously adding 38.5% aqueous NaOH solution to the slurry.

As is evident from Table 1, when a slurry with a liquid phase containing more than 35% NaOH (the above mixture in proportion to the speed of crystallization of the NaOH.3.5 H$_2$O crystals.

4. A part of the produced slurry is continuously removed and large cubic NaOH.3.5 $H_2O$ crystals containing less than 0.15% NaCl are obtained.

Alternatively, at a fixed temperature between 0° to 10°C and at a fixed concentration of liquid phase in the slurry between 32 to 34% NaOH, NaOH, $H_2O$ and/or NaOH solution is added to the slurry, and in proportion to degree of the addition, the corresponding NaOH.3.5 $H_2O$ crystals are precipitated.

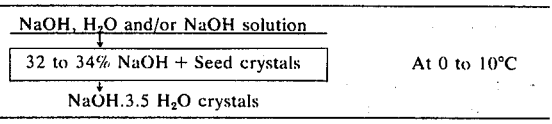

In proportion to the crystallization of NaOH.3.5 $H_2O$ crystals from a 32 to 34% aqueous NaOH solution, the concentration of NaOH in the liquid phase of such an aqueous NaOH solution will be lowered and thus the temperature for saturating NaOH solution to a given NaOH concentration will be lowered. This fact is important for industrially carrying out the process of the present invention.

The NaOH mother liquor from which product NaOH.3.5 $H_2O$ crystals have been removed is saturated with NaCl. This mother liquor can then be admixed with a 45 to 55% homogeneous NaOH solution such that the concentration of NaOH in the resulting mixture is 38 to 42%

$$( \frac{NaOH}{NaOH + H_2O} \times 100)$$

by weight. From the resulting mixture, NaCl is crystallized and separated. The resulting solution from which NaCl has been separated can then be used as a starting solution for the 32 to 34% NaOH solution.

The NaOH content of the liquid phase can be supplemented by adding NaOH, $H_2O$ and/or NaOH solution containing an appropriate concentration of NaOH to the slurry. Of course, by adjusting the rate of addition of NaOH, $H_2O$ and/or NaOH solution, the concentration of the above NaOH solution, and the degree of outside cooling, the concentration of the liquid phase in the slurry can be easily maintained at the specified NaOH concentration of the present invention, i.e., 32 to 34% NaOH solution, or at a specified temperature range, i.e., 10° to 0°C. By the process of the present invention, NaOH.3.5 $H_2O$ crystals can be produced easily and in large quantities without adherence of the crystals to the wall of the reaction vessel.

A part of the thus obtained slurry (the remainder is used as seed crystals) was continuously removed and NaOH.3.5 $H_2O$ crystals were separated. Thereby, NaOH.3.5 $H_2O$ crystals can be continuously produced.

The value of 34% for the NaOH concentration of the present invention is a limiting value for at concentrations above this value, many crystals adhere to the wall of the reaction vessel, wherein less than about 40 g of crystals adhere to the wall per 100 g of crystals in the slurry.

Suitable materials for the wall of the reaction vessel (receptacle) and other equipment employed include stainless steel, iron, nickel, carbon steel and the like. However, for non-adherence of crystals to the wall of the vessel in long-term crystallizing processes, stainless steel is the most preferable. In long term operations, reaction vessels made of carbon steel or other materials, adherence of crystals has been found to a small degree, but in vessels made of stainless steel, such adherence has not been found at all.

Having generally described the invention, a further understanding can be obtained by certain specific examples which are provided herein for purposes of illustration only and are not intended to be limiting in any manner.

EXAMPLE 1

A 1 Kg portion of 34% homogeneous aqueous NaOH solution produced by a diaphragm electrolysis process containing 0.7% sodium chloride by weight was cooled to 5°C in a stainless steel crystallization vessel having an outside cooling jacket, through which water cooled to 30°C was passed. To the cooled solution was added 1 g of NaOH.3.5 $H_2O$ crystals, and NaOH.3.5 $H_2O$ crystallized. The temperature of the thus produced slurry rose to 9.5°C because of the heat of crystallization of the NaOH.3.5 $H_2O$ crystals, and the slurry was then cooled to 5°C for over 1 hour. The produced NaOH.3.5 $H_2O$ crystals were separated from the slurry by a small centrifugal separator and weighed 250 g.

The thus obtained NaOH.3.5 $H_2O$ crystals were 1 to 2 $mm^3$ cubic crystals and were analysed as follows:

| Calculated as NaOH.3.5 $H_2O$: | NaOH 38.33% |
|---|---|
| Found: | NaOH 38.5%, NaCl 0.1% |
| The mother liquor weighed 750 g. | |

Very few crystals of NaOH.3.5 $H_2O$ adhered to the cooling surface of the jacket.

EXAMPLE 2

A 1 Kg portion of a 33% homogeneous aqueous NaOH solution produced by a diaphragm electrolysis process containing 0.7% sodium chloride by weight was cooled to 6°C in a 3 l stainless steel crystallization vessel having a cooling jacket through which 0°C coolant was passed. To the solution at 6°C was added 100 g of NaOH.3.5 $H_2O$ crystals, and NaOH.3.5 $H_2O$ crystallized and grew. To the thus produced slurry, 1 Kg of 38.5% homogeneous aqueous NaOH solution produced by the diaphragm electrolysis process as mentioned above, was continously added over 1 hour in a temperature range between 6° and 7°C. On completion of the addition of the 38.5% aqueous NaOH solution, the produced NaOH.3.5 $H_2O$ crystals were immediately separated from the slurry by centrifugal separator, and weighed 1,150 g. The crystalline form of the thus obtained NaOH.3.5 $H_2O$ crystals was 1 to 2 $mm^3$ cubes.

The thus obtained NaOH.3.5 $H_2O$ crystals were analyzed.

Found: NaOH 38.6%, NaCl 0.05%

The mother liquor weighed 950 g.

Adherence of the crystals to the cooling face in the jacket was found to a slight degree and the volume of NaOH.3.5 $H_2O$ crystals which adhered was small enough to be disregarded.

EXAMPLE 3

A 1 Kg portion of a 34% homogeneous aqueous NaOH solution, prepared in the same manner as in Example 1, containing 0.7% sodium chloride by weight was cooled to 0°C. To the thus obtained solution supercooled with respect to NaOH.3.5 H₂O was added 1 g of seed crystals (NaOH.3.5 H₂O crystals), and NaOH.3.5 H₂O immediately crystallized. The solution changed to a slurry at 6.5°C. The slurry was further cooled to 1°C for 2 hours and the produced NaOH.3.5 H₂O crystals were separated and weighed 380 g. The crystalline form of the thus obtained NaOH.3.5 H₂O crystals was 1 to 2 mm³ cubes.

The thus obtained NaOH.3.5 H₂O crystals were analyzed.

Found: NaOH 38.5% NaCl 0.07%

The thus obtained mother liquid weighed 610 g.

The weight of NaOH.3.5 H₂O crystals, obtained by adherence of the crystals to the cooling face in the jacket, was 10 g.

The above mother liquor may be further applied to the above crystallization and separation process of NaOH.3.5 H₂O crystals. When impurities, such as NaCl, in the mother liquor reach the saturated state, the mother liquor may be used in the concentrating process for cell liquor produced by the electrolytic diaphragm process.

The concentrated NaOH solution is cooled to sufficiently precipitate NaCl crystals and the NaCl crystals are separated. The solution from which NaCl had been separated is diluted with water and is applied to the crystallizing process of NaOH.3.5 H₂O crystals mentioned above, from which pure NaOH.3.5 H₂O crystals may be obtained.

EXAMPLE 4

In this example, the percent value of NaOH is expressed as $$\left( \frac{\text{NaOH}}{\text{NaOH} + \text{impurities} + \text{H}_2\text{O}} \times 100 \right)$$

by weight.

A 2 Kg portion of a 50% homogeneous aqueous NaOH solution produced by the conventional electrolytic diaphragm process, containing 1.1% NaCl, was mixed with 1.03 Kg of water to prepare 3.03 Kg of a 33.0% NaOH solution, in a 3l stainless steel reaction vessel (crystallizing vessel) having a mouth for overflowing solution, an outside cooling jacket and stirrer. Through the cooling jacket, 0°C coolant was passed and the flow was adjusted to maintain a suitable temperature of the materials in the vessel.

The above 3.03 Kg of solution was cooled to 5°C with stirring and to the solution 100 g of NaOH.3.5 H₂O crystals (seed crystals) were added. To the thus obtained slurry 10.39 Kg of 38.5% NaOH solution obtained by mixing the above obtained 50.0% aqueous NaOH solution and 2.39 Kg of water, were added at an addition rate of 2 Kg of solution per 1 hour at fixed temperature of 5° to 6°C ("Crystallization process of NaOH.3.5 H₂O crystals"). After the addition, the temperature of the slurry was adjusted to between 5°C and 6°C and NaOH.3.5 H₂O crystallized and the crystals grew.

When the concentration of the produced slurry increased and the slurry could not be sufficiently stirred, a part of the slurry was removed and NaOH.3.5 H₂O crystals were separated by a centrifugal separator. The obtained mother liquor was used in the above reaction vessel for crystallizing NaOH.3.5 H₂O.

Thus NaOH.3.5 H₂O crystals were repeatedly obtained and in the end, 10.49 Kg (4.04 Kg as NaOH) of NaOH.3.5 H₂O crystals were obtained. The mother liquor weighed 3.08 Kg.

The thus obtained NaOH.3.5 H₂O crystals were analyzed.

Found: NaOH 38.5%, NaCl 0.09%

The above obtained mother liquor contained 32.5% NaOH and 3.20% NaCl. When the mother liquor was further subjected to the crystallizing process of NaOH.3.5 H₂O crystals as mentioned above, NaOH.3.5 H₂O crystals and NaCl crystals were precipitated simultaneously. Therefore, pure NaOH could not be obtained.

From the mother liquor, however, NaCl can be removed by admixing the mother liquor with a 45 to 55% homogeneous aqueous NaOH solution such that the concentration of NaOH in the resulting mixture is 38 to 42%

$$\left( \frac{\text{NaOH}}{\text{NaOH} + \text{H}_2\text{O}} \times 100 \right)$$

by weight, and then crystallizing and separating the NaCl. The resulting solution from which NaCl has been separated can then be recycled and used as additional 38 to 40% homogeneous aqueous NaOH solution. An example of the process for removing NaCl is illustrated as follows:

A 3,077 g amount of the mother liquor containing 32.5% NaOH and 3.20% NaCl was mixed with 2,300 g of the NaOH solution containing 50.0% NaOH and 1.1% NaCl, obtained by concentrating the cell liquor from the electrolytic diaphragm process, to produce 5,377 g of 40% aqueous NaOH solution containing 2.30% NaCl. The thus obtained mixture was cooled at 15°C with sufficient stirring and NaCl crystals precipitated. The thus precipitated NaCl crystals were separated and weighed 54 g (45 g as NaCl) ("The Process for removing NaCl"). The mother liquor weighed 5,330 g and contained 40.3% NaOH and 1.51% NaCl. The mother liquor 625 g of water were added and the mixture was cooled to 5° to 6°C and subjected to the above mentioned process for crystallizing NaOH.3.5 H₂O crystals. By this process 3,550 g of NaOH.3.5 H₂O crystals and 2,400 g of mother liquor were obtained.

The thus obtained NaOH.3.5 H₂O crystals were analyzed.

Found: NaOH 38.5% NaCl 0.11%

The mother liquor contained 32.5% NaOH and 3.20% NaCl. From the mother liquor, NaCl was removed by the above procedure for removing NaCl. The mother liquor was diluted and cooled to 5° to 6°C and subjected to the above mentioned procedure for crystallizing NaOH.3.5 H₂O crystals.

By repeating the above processes, for example, with cell liquor, pure NaOH.3.5 H₂O crystals and pure NaCl crystals could be recovered.

In all of the processes, adherence of the crystals to the inside cooling wall of the reaction vessel was minimal.

What is claimed is:

1. A process for preparing NaOH.3.5 H₂O crystals, which comprises:

cooling a slurry of 32 to 34% homogeneous aqueous NaOH solution and NaOH.3.5 H$_2$O seed crystals at 4° to 6°C, continuously adding 38 to 40% homogeneous aqueous NaOH solution to the slurry at 4° to 6°C while maintaining the concentration of the aqueous NaOH solution at 32 to 34% NaOH;

precipitating NaOH.3.5 H$_2$O crystals from said solution to form a slurry of said precipitated crystals in the solution;

continuously removing a part of the produced slurry; and separating the precipitated NaOH.3.5 H$_2$O crystals therefrom.

2. The process of claim 1, wherein the solution from which said precipitated NaOH.3.5 H$_2$O crystals are separated, is added to the said NaOH aqueous solution containing NaOH.3.5 H$_2$O seed crystals.

3. The process of claim 1, which further comprises:

admixing said solution from which NaOH.3.5 H$_2$O crystals have been separated and which is saturated with NaCl, with a 45 to 55% homogeneous aqueous NaOH solution such that the concentration of NaOH in the resulting mixture is 38 to 42%

$$\left( \frac{NaOH}{NaOH + H_2O} \times 100 \right)$$

by weight;

crystallizing and separating NaCl from said mixture; and employing said mixture from which NaCl has been separated as said 38 to 40% homogeneous aqueous NaOH solution.

4. The process of claim 3, which further comprises:

admixing said 32 to 34% NaOH solution from which NaOH.3.5 H$_2$O crystals have been separated and which is saturated with NaCl, with a 45 to 55% homogeneous aqueous NaOH solution such that the concentration of NaOH in the resulting mixture is 38 to 42%

$$\left( \frac{NaOH}{NaOH + H_2O} \times 100 \right)$$

by weight;

crystallizing and separating NaCl from said mixture; and employing said mixture from which NaCl has been separated as a starting solution for said 32 to 34% homogeneous aqueous NaOH solution.

5. A process for preparing NaOH.3.5 H$_2$O crystals, which comprises;

adding a member selected from the group consisting of NaOH, H$_2$O, aqueous NaOH and mixtures thereof to an NaOH solution containing NaOH.3.5 H$_2$O seed crystals at a temperature of from 10° to 0°C, so as to adjust the concentration of NaOH in the liquid phase of said NaOH solution to from 32 to 34% NaOH $$\left( \frac{NaOH}{NaOH+H_2O} \times 100 \right)$$

by weight;

precipitating NaOH.3.5 H$_2$O crystals from said 32 to 34% NaOH solution; and separating said precipitated NaOH.3.5 H$_2$O crystals from said solution.

6. The process of claim 5, wherein said aqueous NaOH solution, which is added to said NaOH solution containing NaOH.3.5 H$_2$O seed crystals is a 38 to 40% aqueous NaOH solution.

7. The process of claim 5, wherein said temperature is 4° to 6°C.

8. A process for preparing NaOH.3.5 H$_2$O crystals, which comprises:

cooling a slurry mixture of a homogeneous aqueous NaOH solution of 32 to 34%

$$\left( \frac{NaOH}{NaOH + H_2O} \times 100 \right)$$

by weight NaOH containing sodium chloride and NaOH.3.5 H$_2$O seed crystals to below the temperature for saturating said solution with respect to NaOH.3.5 H$_2$O;

precipitating NaOH.3.5 H$_2$O crystals from said 32 to 34% NaOH solution; and separating said precipitated NaOH.3.5 H$_2$O crystals from said solution.

9. The process of claim 8, wherein said NaOH aqueous solution is cooled to 10° to 0°C.

* * * * *